United States Patent
Dezonno

(10) Patent No.: US 6,865,267 B2
(45) Date of Patent: Mar. 8, 2005

(54) METHOD AND SYSTEM FOR ROUTING TRANSACTIONS IN AN AUTOMATIC CALL DISTRIBUTION SYSTEM BASED ON NON-VOICE DIALOG AGENT SKILL SET

(75) Inventor: Anthony J. Dezonno, Bloomingdale, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 528 days.

(21) Appl. No.: 09/995,027

(22) Filed: Nov. 27, 2001

(65) Prior Publication Data

US 2003/0099343 A1 May 29, 2003

(51) Int. Cl.⁷ .............................................. H04M 3/00
(52) U.S. Cl. ......................... 379/265.06; 379/265.02; 379/265.09; 379/265.12
(58) Field of Search ......................... 379/88.17, 265.02, 379/265.03, 265.05, 265.06, 265.09, 265.11, 265.12, 265.13, 266.1

(56) References Cited

U.S. PATENT DOCUMENTS

| | | |
|---|---|---|
| 5,127,004 A | 6/1992 | Lenihan et al. |
| 5,140,611 A | 8/1992 | Jones et al. |
| 5,268,903 A | 12/1993 | Jones et al. |
| 6,064,730 A * | 5/2000 | Ginsberg ............... 379/265.09 |
| 6,097,806 A | 8/2000 | Baker et al. |
| 6,222,919 B1 * | 4/2001 | Hollatz et al. .......... 379/265.12 |
| 6,230,287 B1 * | 5/2001 | Pinard et al. .................. 714/31 |
| 6,233,332 B1 * | 5/2001 | Anderson et al. ....... 379/265.09 |
| 6,289,373 B1 | 9/2001 | Dezonno |
| 6,389,132 B1 * | 5/2002 | Price ...................... 379/265.01 |
| 6,553,114 B1 * | 4/2003 | Fisher et al. ............ 379/265.12 |
| 6,570,980 B1 * | 5/2003 | Baruch .................... 379/265.12 |
| 6,636,599 B1 * | 10/2003 | Mullen ................... 379/265.05 |
| 6,661,889 B1 * | 12/2003 | Flockhart et al. ....... 379/265.05 |
| 6,665,395 B1 * | 12/2003 | Busey et al. ............ 379/265.09 |
| 6,704,410 B1 * | 3/2004 | McFarlane et al. ..... 379/265.05 |
| 6,744,877 B1 * | 6/2004 | Edwards ................ 379/265.02 |

* cited by examiner

*Primary Examiner*—Bing Q. Bui
(74) *Attorney, Agent, or Firm*—Welsh & Katz, Ltd.

(57) ABSTRACT

A method and system for routing incoming calls from callers to agents associated with an automatic call distribution system, where the incoming calls are based on non-voice dialog communication, the method includes the steps of: identifying a plurality of transaction-handling skills representative of skills possessed by the agents in handling the non-voice dialog communication, calculating a skill level possessed by each agent for at least some of the plurality of transaction-handling skills, forming an agent profile for each agent corresponding to the calculated skill levels, assigning a weight to each calculated skill level for each agent, identifying agents who are available to handle the incoming call, selecting an available agent based on the weighted calculated skill levels, and transferring the incoming call to the selected agent.

38 Claims, 3 Drawing Sheets

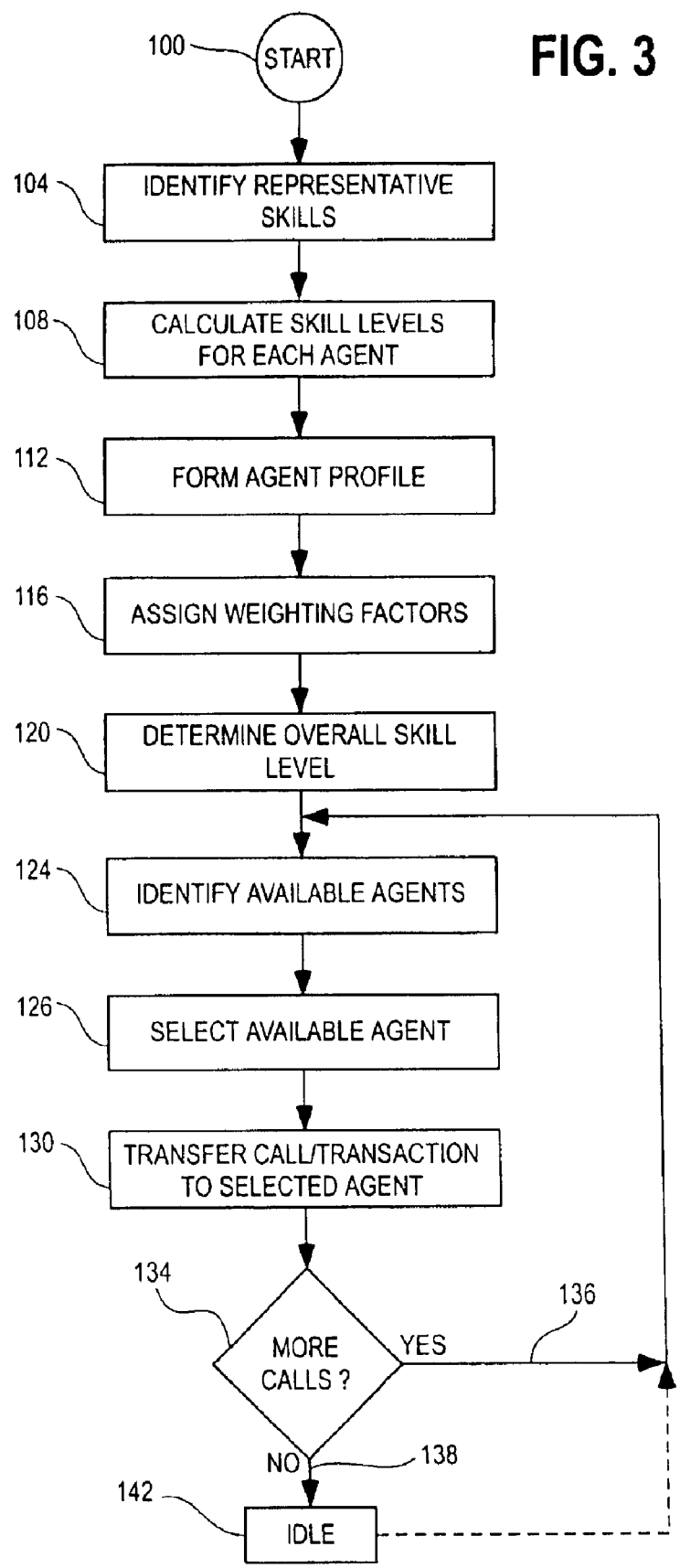

METHOD AND SYSTEM FOR ROUTING TRANSACTIONS IN AN AUTOMATIC CALL DISTRIBUTION SYSTEM BASED ON NON-VOICE DIALOG AGENT SKILL SET

FIELD OF THE INVENTION

The present invention relates generally to a method and system for routing calls to agents of an automatic call distributor system ("ACD"), and more specifically to a method and system to route calls to the agents during non-voice dialog communication between the agent and a caller.

BACKGROUND

Systems which automatically distribute customer contacts or calls (generically referred to as "ACD") are often employed in telemarketing environments in which agents stationed at agent telephone sets answer many different types of telephone calls and other types of customer contacts (e.g., VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, ACD's may be used exclusively by or on behalf of a single vendor such that all of the contacts processed by the agent involve one particular vendor.

Often, a customer call is distributed to an agent that involves interactive voice dialog. This means a normal two-way verbal exchange. In this situation, an agent is selected based on various criteria, such as specialized knowledge concerning the product or service in which the customer is interested. The agent may also be selected to receive the incoming call based on his or her verbal skills and conversational abilities. U.S. Pat. No. 6,222,919 B1 relates to agent skills based on product knowledge or skills pertinent to the subject matter of the voice transaction, and is owned by the assignee of the present invention, and is hereby incorporated by reference in its entirety.

An ACD, however, may also distribute a non-voice dialog contact or call to the agent. This does not involve direct two-way speech between the agent and the customer or caller. Non-voice dialog communication may be, for example, emails, facsimile, chat room dialog, instant messaging, Internet, etc. and the like. This is becoming more common as Internet traffic and electronic sales transactions increase. Handling of the non-voice dialog contact may require a specialized device or subcomponent of the ACD. In this situation, the agent will typically view text on a display screen that the caller typed in or transmitted. In response, the agent may provide information to the contact or request information from the caller, via the keyboard or other input device. Essentially, the dialog between the agent and the caller occurs on a display screen. Further, the agent may handle multiple calls. For example, the agent may typically handle two to five simultaneous non-voice dialog communications or transactions, which may be presented as two to five separate dialog windows on the display screen, which windows may be tiled or layered. Of course, the number of simultaneous transactions may vary significantly.

To effectively handle non-voice dialog transactions, the agent must possess skills different from the skills involved in handling voice-dialog calls. Because the agent must transact business via a display screen, and may handle several transactions simultaneously, the agent must be selected based on skills directed to handling such non-voice dialog communications. Accordingly, it is desirable to provide a method and system for selecting agents of an ACD based on skill sets directed to non-voice dialog transactions or communication.

SUMMARY

The disadvantages of present methods and systems of selecting agents to handle incoming calls are substantially overcome with the present invention by providing a novel method and system for routing transactions using agent skill sets directed to non-voice dialog in an automatic call distribution system.

More specifically, in one embodiment of an automatic call distribution (ACD) system, the present invention includes a method for routing incoming calls from callers to agents associated with the ACD, where the incoming calls are based on non-voice dialog communication. The embodiment includes the steps of: identifying a plurality of transaction-handling skills representative of skills possessed by the agents in handling the non-voice dialog communication, calculating a skill level possessed by each agent for at least some of the plurality of transaction-handling skills, forming an agent profile for each agent corresponding to the calculated skill levels, assigning a weight to each calculated skill level for each agent, identifying agents who are available to handle the incoming call, selecting an available agent based on the weighted calculated skill levels, and transferring the incoming call to the selected agent.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 3 is an exemplary flowchart showing various steps according to one embodiment of a specific method for routing incoming calls.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
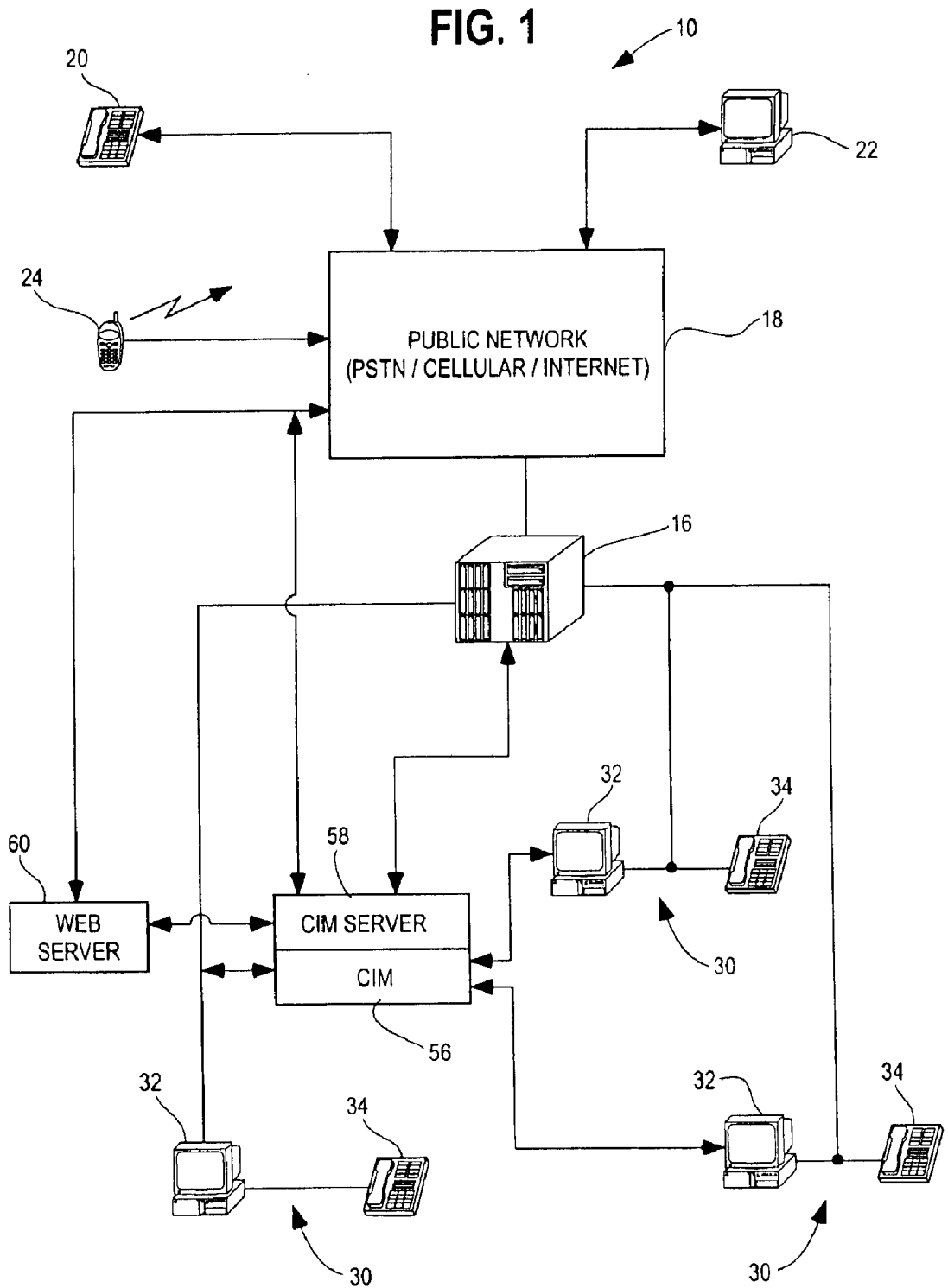
FIG. 1 is a pictorial representation of a specific embodiment of a transaction processing system showing a customer computer and an exemplary automatic call distributor.

Referring now to FIG. 1, an exemplary embodiment of a system 10 for facilitating routing of incoming calls or contacts ("transactions") to agents associated with an automatic call distributor or automatic contact distributor system (ACD) 16 is shown generally. The ACD 16 processes both voice-dialog communications or transactions, as well as non-voice dialog communications and transactions, as described hereinafter. The present invention may be implemented in numerous types and sizes of systems for distributing calls to selected ones of a plurality of agents. One example of an ACD system that may be used in the present invention is the SPECTRUM ACD product, available from Rockwell Electronic Commerce Corp. of Illinois.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

A customer or caller may be connected to the ACD 16 through a public switched telephone network (PSTN) 18, which caller may connect to the PSTN through a standard telephone set 20, a computer 22, a cellular telephone 24, or any suitable communication device. Note that the term "caller" as used herein does not necessarily mean that the contact or person using the telephone 20, for example, initiated the call to the agent. Notably, the agent may have initiated the call to the contact. Accordingly, the term "caller" shall broadly refer to the contact or potential customer even though the agent may have originated or initiated the call or contact. Additionally, the term "call" may be a telephone call, or it may be any other form of communication (emails etc.) as set forth above.

In the illustrated embodiment, multiple agent stations or terminals 30 are shown coupled to the ACD 16. For purposes of illustration, only three agent stations are shown, but any suitable number of agents may be coupled to the ACD 16. The agent stations 30 may also include agent station computers 32 or terminals, and/or telephone sets 34.

Figure 2:
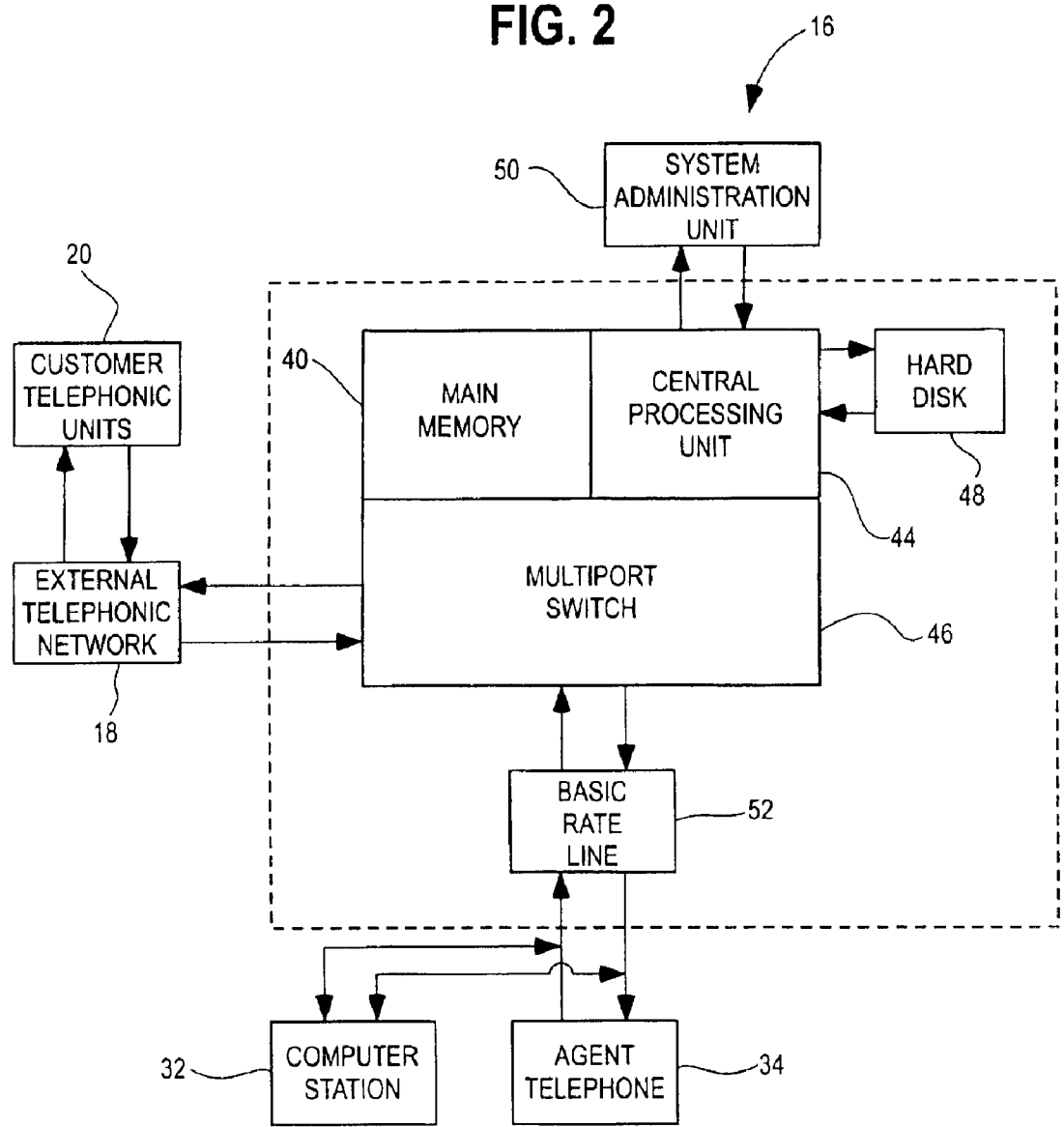
FIG. 2 is a block diagram of a specific example of a known ACD system.

Referring now to FIGS. 1 and 2, FIG. 2 shows the an example of an ACD 16 in greater detail. The ACD 16 may comprise hardware and/or software and, for example, may include a main memory 40, a central processing unit 44 and a multiport switch 46, each of which may be separate units, distributed components, or integrated at a single location or single cabinet. The multiport switch 46 is coupled to the PSTN 18, which in turn, is connected to customer telephones 20 or other communication devices (20, 22, or 24). The central processing unit 44 may include storage, such as hard disk storage 48, and may also be coupled to a system administration unit 50. The ACD 16 is connected through a suitable communication link to the plurality of agent telephonic sets 34, for example, through a basic rate line 52, as is known in the art. The agent computer station 32 and the agent telephone sets 34 may be incorporated into a single unit, as is known in the art.

The illustrated ACD 16 may handle voice communication and may also handle non-voice communication, such as emails, facsimile, chat room dialog, instant messaging, Internet, etc. Non-voice dialog communication is another form of contact communication and the ACD 16, when configured and coupled to appropriate hardware and/or software devices, as described below, is not limited to processing voice-based telephone calls. The ACD 16 may be a single integrated device, or may include distributed hardware and software. In one specific embodiment, the SPECTRUM ACD product available from Rockwell Electronic Commerce Corp. may include a non-voice dialog communication processor, such as a Contact Integration Manager (CIM) 56, which may, for example, be a CIM Release No. 1.1, which is also available from Rockwell Electronic Commerce Corp. In the specific embodiment shown, the communication processor 56 or CIM (also referred to as non-voice dialog communication processor or communication processor) may handle the non-voice dialog communication between the customer or caller, and the agent.

The communication processor 56 may be operatively coupled to the ACD 16 and to the agent computer 32 or agent stations 30. Typically, the communication processor 56 receives email, chat room dialog, facsimile, instant message, Internet communication, and the like from a communication processor server 58. The communication processor server 58, in turn, may receive additional non-voice dialog contact communication from a web server 60, which may be connected to the PSTN 18. In one specific embodiment, the communication processor 58 may be separate from the ACD 16 and operatively coupled to the ACD 16. Alternatively, the communication processor 56 may be integrated into a portion of the ACD 16 or any other processor or processors in the system. In another embodiment, at least a portion of the communication processor 56 functionality may be part of the agent station computer 32, which may be, for example, a personal computer. The communication processor 56 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like.

With respect to the method described in detail below, the term ACD 16 is used interchangeably to mean either the ACD and/or the communication processor 56, or a combination of both. Both terms relate to a "transaction processing system" and because the ACD 16 and the communication processor 56 may be so closely related or the functions so distributed that a meaningful distinction may not be able to be made with respect to which particular component is performing a specific step described. Accordingly, for purposes of illustration only, the below-described method will be described in terms of the ACD 16 performing the step, even though a separate component or subcomponent, such as the communication processor 56, may actually perform the step or process.

The communication processor 56 in the illustrated embodiment is configured to facilitate sending and receiving non-voice dialog communication between the caller and the agent or agent terminal 30, and to transmit a signal to the ACD 16 indicating that the communication processor received the non-voice dialog communication from the caller. The signal from the communication processor 56 to the ACD 16 creates a "call appearance" so that the ACD is brought into the communication "loop," and is able to track the contact. The call appearance simulates to the ACD 16 the appearance of a voice-type call, even though a voice-type call is not present. Once the call appearance to the ACD 16 has been made, the ACD can queue and track the non-voice dialog communication to the appropriate agent as if the call were an ordinary interactive voice-dialog call, even though the ACD may not utilize or connect its voice channel to the agent. Rather, the communication processor 56 may handle the non-voice dialog communication and provide the call to the agent, and also inform the ACD 16 regarding the status and initiation of the call.

Accordingly, once the call appearance has been made, the ACD 16 in the illustrated embodiment of FIG. 1 selects a particular agent to receive the non-voice dialog communication from the communication processor 56, and then causes the non-voice dialog communication to be routed to the selected agent by the communication processor. In known automatic call distribution systems, selection of the agent is performed according to any suitable method including known methods, such as the agent's availability, time past since prior contact, number of calls previously processed by the agent, efficiency rating of the agent, and the like.

As described above, known transactions processing systems, such as ACD's, typically route incoming telephone calls to agents based upon an agent's knowledge of the subject matter of the voice-dialog transaction. For example, if the caller or potential customer is inquiring about a product, such as a food processor, the call would be routed to the agent having the most knowledge about small kitchen appliances.

When processing non-voice dialog communication or contact, however, an agent's knowledge of the subject matter of the communication is secondary to the agent's ability to effectively communicate via the keyboard and display device. Regardless of an agent's knowledge of the subject matter of the transaction or product of interest, if the agent is inept with respect to computer skills or cannot quickly or accurately type, the agent will not be successful. Accordingly, it is important to identify and evaluate the transaction-handling skills (skill set) possessed by the agents in handling the non-voice dialog communication. Note that such non-voice dialog communications may include, but are not limited to, for example, emails, facsimile, chat room dialog, instant messages, Internet transactions, and the like.

Referring now to FIG. 1 and the flowchart of FIG. 3, the following description of one embodiment of a specific method for routing incoming calls is best understood in conjunction with the flowchart, where some of the steps are specifically identified as a "step" followed by a reference numeral. The method begins at a step 100.

According to one embodiment, a plurality of transaction-handling skills representative of skills possessed by the agents in handling non-voice dialog communications or transactions are identified, as shown in a step 104. Typically, these skills have been identified as being important indicators associated with a successful transaction. Such transaction-handling skills may relate to typing speed, typing accuracy, reading speed, reading comprehension, the ability to handle multiple simultaneous transactions (also referred to as agent call handling capacity), experience level in handling non-voice dialog communications, agent response time, and context switching speed. Note that these exemplary transaction-handling skills are unrelated to the subject matter of the non-voice dialog communication, that is, they are unrelated to the product or service at issue.

Next, for each agent, a skill level possessed by that agent for the above-identified transaction-handling skills is determined, as shown in a step 108. This may be calculated, for example, by the central processing unit 44 or computer station 32, or may be determined, for example, by a supervisor. Of course, not all of the above-identified skills need be evaluated or calculated for all of the agents, and some skills not listed my be included without departing from the scope of the invention. There are different ways to calculate or evaluate the various skills, and some skill levels may be more difficult than others to ascertain, as described below.

Once the agent skill level has been ascertained, as described below in greater detail, an agent profile for each agent is generated, which includes each of the calculated skill levels, as shown in a step 112. The agent profile may be a file or database stored in the memory or disk storage of the ACD 16, as is known in the art. The agent profile may be set up as a matrix or data structure with the various skills listed with the corresponding skill level. Regardless of the structure of the agent profile in one embodiment, the ACD 16 is able to create and access the profile to utilize the data.

With respect to calculating or determining the skill level for the above-mentioned non-voice dialog communications, one method, according to a specific embodiment, is to assign a default value. A default value, such as an average or typical value, may be used if the skill level cannot be obtained or if the skill is deemed to be inapplicable, or if it is determined to be unimportant.

Alternately, a skill level may be assigned or determined by the agent's supervisor or other personnel based on observation of the agent. This approach may be somewhat subjective, and of course, such skill levels may be periodically adjusted or recalculated as the skill levels change. For example, the supervisor may observe that an agent is particularly adept at handling many transactions simultaneously because the agent remains calm and does not become flustered, or is particularly quick. In this case, the supervisor would assign a high number or value to the agent's skill level corresponding to the ability to handle multiple simultaneous transactions (agent call handling capacity). An automatic approach may also be used, as described below.

Of course, the transactions or communications referred to herein are not truly "simultaneous," because a human agent can only perform one task at a time. The term "simultaneous transaction" means that multiple contacts, calls or transactions are routed to the agent and are active at the same time. The agent is essentially "multiplexed" between the multiple transactions. For each contact or transaction, a dialog box may appear on the agent's display or agent computer 32, and the agent is able to communicate with the caller via the keyboard or other input device (not shown). A second contact may then also be routed to the same agent, and a second dialog box would then appear on the display. Because non-voice dialog communication is occurring, rather than a standard two-way voice conversation, there is some delay between transmission of one communication and response thereto from the other party. The agent can benefit from this delay by servicing the second caller during this response delay time. Additional contacts may be routed to the same agent until the agent reaches his or her maximum capacity. Typically, an average agent can handle about four "simultaneous" transactions before the agent's efficiency is degraded. Of course, this depends on the complexity of the subject matter and the level of detail contained in the communication or transaction. The agent's level of job experience may also play a role.

Other skill levels may be assessed based on results of objective standardized tests. For example, reading comprehension may be difficult to measure based upon a supervisor's observations. Accordingly, the skill of reading comprehension, for example, may be measured based upon test results gathered sometime during the agent's term of employment.

Alternatively, some skill levels may be measured automatically by the transaction processing system or ACD 16. The ACD 16 may monitor the agent's performance and review the communication between the agent and the caller. This may be performed, for example, over a predetermined or variable period of time, or alternately may be performed over a predetermined or variable number of transactions. Any suitable criteria may be used as long as a statistically valid sample is obtained.

Skills well suited for automatic monitoring and automatic skill level calculation may include, for example, reading speed, typing speed and typing accuracy. Call handling capacity and context switching skill may also be monitored and calculated automatically by the ACD 16, as described below. In particular, the ACD 16 (or any computer) is well suited to calculate typing speed, either in characters per minute, words per minute, or sentences per minute because all characters input via the keyboard or received by the display screen may be monitored by the ACD 16. Further, typing accuracy may be measured, for example, by employing a spelling checker. A commercially available spelling checker program, such as spell-checking software available from Microsoft Corporation, may be used. In this way, the ACD 16 can automatically evaluate typing speed and accuracy, and assign a skill level to the specific agent skills.

As mentioned above, certain skills, such as ability to handle multiple simultaneous transactions (agent call handling capacity), agent response time, and context switching speed may be calculated automatically by the ACD. For example, with respect to automatic monitoring and calculation of agent call handling capacity, a measure of the average transaction time when measured over a large number of transactions or over a sufficiently large period of time, tends to converge to a generally constant value. For example, it may be found that the average agent can handle four simultaneous transactions and that each transaction requires about four minutes. Accordingly, on average, all four simultaneous transactions would be completed in about sixteen minutes (4 transactions×4 minutes per transaction), which is a probabilistic average value.

As the number of simultaneous transactions handled by the agent increases (agent call handling capacity), however, the agent must spend more time between transactions to refresh his memory and gather his thoughts in order to make an appropriate response to the caller. The time required grows exponentially beyond a fixed number of simultaneous transactions. Accordingly, agent efficiency, and hence customer satisfaction drops dramatically when the number of simultaneous transactions increases beyond the agent's call handling capacity. Thus, with respect to the above example, an agent having a call handling capacity of four transactions that is given six transactions may require much more than twenty-four minutes (6 transaction×4 minutes per transaction) because the agent's call handling capacity has been exceeded.

With the above caveat in mind, the ACD 16 may automatically calculate or determine the skill levels corresponding to the ability to handle multiple transactions (agent call handling capacity) and context switching speed by monitoring and tracking the agent's transaction handling time to establish an average value. This average value is then compared to the probabilistic average value to determine whether a particular agent possesses skill above or below the probabilistic average value. The ACD 16 may then automatically assign the corresponding skill level.

With respect to the various agent skills, depending upon the particular transaction or sales environment, the transaction-handling skills may not all be of equal importance in determining an agent's desirability or prowess. According to one specific embodiment, each calculated skill level may be assigned a weight or weighting factor, as shown in a step 116. The weighting reflects the relative importance attached to each agent skill at issue.

The weighted factors may also be entered into the agent's profile. According to one embodiment, an overall skill level may then be calculated for each agent and saved in the agent's profile based upon the weighted calculated skill levels, as shown in a step 120. The overall skill level may be a single number representative of the agent's merit, and may be based upon the sum or a normalized representation of the weighted skill levels. According to an alternate embodiment, the agent's identification or station number/address may be entered into an agent list that is sorted according to the respective overall skill level. For example, the first agent in the agent list may be the most desirable agent because he or she has the highest overall skill level.

Note that the steps 100, 104, 108, 112, 116, and 120 are essentially "preliminary" steps, meaning that they are not necessarily repeated continuously. Once the step 120 has been performed, i.e., determining the overall skill level, the ACD 16 in some embodiments may not need to repeat this step unless the agent profile is being updated or a new agent is added to the roster of agents. As of the step 120, the basic information needed for the ACD 16 to perform its routing function is deemed complete.

Next, in one specific embodiment, the ACD may determine which of the agents are available, meaning, which agents are candidates for receiving the call, as shown in a step 124. For example, an agent who is away from the agent station on a break, who is otherwise away from the agent station, or who is already handling a maximum number of transactions, is not a candidate to receive a new call. Thus, that agent is unavailable. Of course, in a very busy system, no agents may be instantly available. In that case, the call is placed in a queue to await the next "available" agent.

After the available agents have been identified, the ACD 16 in one embodiment may select one of the available agents based on their agent profile, and in particular, based on the overall skill level attributable to that agent, as shown in a step 126. The ACD 16 may then route or transfer the transaction or contact (incoming call) to the selected agent, as shown in a step 130. Of course, the ACD 16 may select the available agent based upon the "raw" skill levels or upon the weighted skill levels, rather than the overall skill level, without departing from the scope of the invention. Alternatively, the ACD 16 may route the incoming call to the first agent listed in the agent list, which first agent may have the highest overall skill level.

If more calls or transactions exist (a step 134) for which the ACD 16 must transfer to an agent, as shown in a "yes" branch 136 of the step 134, the above process beginning at the step 124 is repeated. If no more calls exist, as shown in a "no" branch 138, the process remains in an idle state, as shown in a step 142, until such time as additional calls are received. If additional calls are received, the idle state of the step 142 is interrupted (shown in dashed lines) and the process continues from the step 124.

An alternate embodiment, the amount of time that an agent has been idle may also be considered. In this embodiment, an agent who has been idle for more than a predetermined period of time, or who has been idle for longer than other agents, is essentially "moved up" in priority so that the ACD 16 selects that agent to receive the incoming call, even though there may be more qualified available agents, such as those who have a higher overall skill level. Any suitable combination of skill levels, weighted skill levels, overall skill level, and past idle time may be used to determine the selection of the agent to handle the incoming transaction or call.

In a further alternate embodiment, the ACD 16 may direct an incoming call or transaction to an available agent based upon the agent's call handling capacity relative to the number of transactions that the agent is currently handling (current work load). For example, if the agent is able to handle eight simultaneous transactions and is currently handling only two transactions (25% capacity), that agent will be given priority over an agent who is also handling two transactions, but has a call handling capacity of only four transaction (50% capacity). In this way, the agent's capacity or work load is optimized according to his or her ability. An agent capacity quotient may be calculated by dividing the number of transactions the agent is currently handling by the agent's call handling capacity. The agent capacity quotient may also be used in combination with the agent's overall skill level and past idle time in determining which agent to select.

Note that the order of the steps described above and shown in FIG. 3 need not be expressly followed in the order shown. For example, the step of assigning a weight to the skill level (step 116), which also may be an optional step, may be performed either before or after the step of identifying which agents are available (step 124). Additionally, in an alternate embodiment, the weighted values need not be entered into each agent profile. The ACD 16 may calculate the weighted values "on the fly" as the raw agent skill levels in the agent profiles are inspected.

Specific embodiments of data skill set routing for non-voice dialog in an automatic call distribution system according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. In an automatic call distribution system, a method for routing incoming calls from callers to agents associated with the automatic call distribution system, at least some of the incoming calls based on non-voice dialog communication, the method comprising:

identifying a plurality of transaction-handling skills representative of skills possessed by the agents in handling the non-voice dialog communication;

for each agent,
determining a skill level possessed by the agent for at least some of the plurality of transaction-handling skills;
forming an agent profile corresponding to the determined skill levels, wherein the agent profile includes an indication of call-handling capacity for each agent, the call-handling capacity representative of the number of non-voice dialog communications the agent is capable of handling simultaneously;
assigning a weight to each determined skill level;

identifying agents who are available to handle the incoming call;

selecting an available agent based on the determined skill levels; and transferring the incoming call to the selected agent.

2. The method according to claim 1 wherein the transaction-handling skills are not based on product knowledge.

3. The method according to claim 1 wherein the agent profile is in the form of at least one of an array, a matrix, a database and a data structure.

4. The method according to claim 1 wherein the transaction-handling skills are not related to a subject matter of the non-voice dialog communication.

5. The method according to claim 1 further including the step of determining an overall skill level for each agent based upon the weighted determined skill levels.

6. The method according to claim 5 wherein the incoming call is transferred to the available agent having a highest overall skill level.

7. The method according to claim 5 wherein the agents are entered into an agent list and sorted according to the overall skill level and wherein the incoming call is transferred to the first agent in the agent list.

8. The method according to claim 1 wherein the incoming call is transferred to the agent based upon at least one of the agent's determined skill levels and overall skill level, and a length of time that the agent has been idle.

9. The method according to claim 1 further including the step of calculating an agent capacity quotient by dividing the number of calls an agent is currently handling by the agent's call-handling capacity, said quotient representative of the number of calls an agent is currently handling relative to the agent's call-handling capacity.

10. The method according to claim 9 wherein the incoming call is transferred to the agent based upon the calculated skill levels and the agent capacity quotient.

11. The method according to claim 9 wherein selection of the agent to receive the incoming call based on the agent capacity quotient optimizes a work load of the agent.

12. The method according to claim 1 wherein the transaction-handling skills are selected from the group consisting of typing speed, typing accuracy, reading speed, reading comprehension, ability to handle multiple simultaneous transactions, experience level in handling non-voice dialog communications, agent response time, and context switching speed.

13. The method according to claim 12 wherein the skill level for at least one of said typing speed, said typing accuracy, and said context switching speed is calculated based on automatic monitoring of a predetermined number of past non-voice dialog communications handled by the agent.

14. The method according to claim 12 wherein the skill level for said reading comprehension is determined based on results of standardized tests.

15. The method according to claim 13 wherein the skill level for said typing accuracy is automatically monitored using a spelling checking software program.

16. The method according to claim 13 wherein the skill level for at least one of said typing speed, said typing accuracy, and said context switching speed is periodically updated based upon the automatic monitoring.

17. The method according to claim 13 wherein the automatic monitoring is performed for a predetermined period of time.

18. The method according to claim 13 wherein the automatic monitoring is performed for a predetermined number of non-voice dialog communications handled by the agent.

19. The method according to claim 1 wherein the skill levels for some of the transaction-handling skills are calculated using techniques selected from the group consisting of assigning a default level, assigning a skill level by a supervisor based on observation of the agent, assigning a skill level based on results of standardized tests, and assigning a skill level based on automatic monitoring of the agent's transactions.

20. In an transaction processing system, a method for routing incoming calls from callers to agents associated with the transaction processing system, at least some of the incoming calls based on non-voice dialog communication, the method comprising:

identifying a plurality of transaction-handling skills representative of skills possessed by the agents in handling the non-voice dialog communication;

for each agent,
determining a skill level possessed by the agent for at least some of the plurality of transaction-handling skills;
forming an agent profile corresponding to the determined skill levels, the agent profile including an indication of call-handling capacity for each agent, the call-handling capacity representative of the number of non-voice dialog communications the agent is capable of handling simultaneously;
assigning a weight to each determined skill level;
determining an overall skill level for each agent based upon the weighted determined skill levels contained in the agent profile;

identifying agents who are available to handle the call;
selecting an available agent based on the overall skill level; and
transferring the incoming call to the selected agent.

21. The method according to claim 20 wherein the incoming call is transferred to the agent based upon the agent's overall skill level and a length of time that the agent has been idle.

22. The method according to claim 20 wherein the transaction-handling skills are selected from the group consisting of typing speed, typing accuracy, reading speed, reading comprehension, ability to handle multiple simultaneous transactions, experience level in handling non-voice dialog communications, agent response time, and context switching speed.

23. The method according to claim 22 wherein the skill level for at least one of said typing speed, said typing accuracy, and said context switching speed is calculated based on automatic monitoring of a plurality of past non-voice dialog communications handled by the agent.

24. The method according to claim 23 wherein the skill level for said typing accuracy is automatically monitored using a spelling checking software program.

25. The method according to claim 23 wherein the skill level for at least one of said typing speed, said typing accuracy, and said context switching speed is periodically updated based upon the automatic monitoring.

26. The method according to claim 20 wherein the skill levels for some of the transaction-handling skills are calculated using techniques selected from the group consisting of assigning a default level, assigning a skill level by a supervisor based on observation of the agent, assigning a skill level based on results of standardized tests, and assigning a skill level based on automatic monitoring of the agent's transactions.

27. In an transaction processing system, a method for routing incoming calls from callers to agents associated with the transaction processing system, at least some of the incoming calls based on non-voice dialog communication, the method comprising:

identifying a plurality of transaction-handling skills representative of skills possessed by the agents in handling the non-voice dialog communication;

for each agent:
determining a skill level possessed by the agent for at least some of the plurality of transaction-handling skills;
forming an agent profile corresponding to the determined skill levels, the agent profile including an indication of call-handling capacity for each agent, the call-handling capacity representative of the number of non-voice dialog communications the agent is capable of handling simultaneously;
assigning a weight to each determined skill level;
determining an overall skill level for each agent based upon the weighted determined skill levels contained in the agent profile;

identifying agents who are available to handle the call;
selecting an available agent based on the overall skill level; and
transferring the incoming call to the selected agent.

28. The method according to claim 27 further including the step of calculating an agent capacity quotient by dividing the number of calls an agent is currently handling by the agent's call-handling capacity, said quotient representative of the number of calls an agent is currently handling relative to the agent's call-handling capacity.

29. The method according to claim 28 wherein the incoming call is transferred to the agent based upon the determined skill levels and the agent capacity quotient.

30. The method according to claim 28 wherein selection of the agent to receive the incoming call based on the agent capacity quotient optimizes a work load of the agent.

31. A transaction processing system configured to route incoming calls from callers to agents associated with the transaction processing system, at least some of the incoming calls based on non-voice dialog communication, the system comprising:

a plurality of agent terminals associated with the agent and with the processing system;
means for storing skill level data associated with the agents;
processing means coupled to the agent terminals and the means for storage, for identifying a plurality of transaction-handling skills representative of skills possessed by the agents in handling the non-voice dialog communication, the processing means configured to calculate a skill level possessed by each agent for at least some of the plurality of transaction-handling skills, generate an agent profile for each agent corresponding to the calculated skill levels, the agent profile including an indication of call-handling capacity for each agent, the call-handling capacity representative of the number of non-voice dialog communications the agent is capable of handling simultaneously, assign a weight to each calculated skill level for each agent, identify agents who are available to handle the incoming call, select an available agent based on the weighted calculated skill levels, and transfer the incoming call to the selected agent.

32. The system according to claim 31 wherein the incoming call is transferred to the agent based upon the agent's overall skill level and a length of time that the agent has been idle.

33. The system according to claim 31 wherein the transaction-handling skills are selected from the group consisting of typing speed, typing accuracy, reading speed, reading comprehension, ability to handle multiple simultaneous transactions, experience level in handling non-voice dialog communications, agent response time, and context switching speed.

34. The system according to claim 31 wherein the skill levels for some of the transaction-handling skills are calculated using techniques selected from the group consisting of assigning a default level, assigning a skill level by a supervisor based on observation of the agent, assigning a skill level based on results of standardized tests, and assigning a skill level based on automatic monitoring of the agent's transactions.

35. The system according to claim 31 wherein the skill level for at least one of said typing speed, said typing accuracy, and said context switching speed is periodically updated by the processing means based upon the automatic monitoring.

36. A transaction processing system configured to route incoming calls from callers to agents associated with the transaction processing system, at least some of the incoming calls based on non-voice dialog communication, the system comprising:

a plurality of agent terminals associated with the agent and with the processing system;

means for storing skill level data associated with the agents;

processing means coupled to the agent terminals and the means for storage, for identifying a plurality of transaction-handling skills representative of skills possessed by the agents in handling the non-voice dialog communication, the processing means configured to calculate a skill level possessed by each agent for at least some of the plurality of transaction-handling skills, generate an agent profile for each agent corresponding to the calculated skill levels, assign a weight to each calculated skill level for each agent, identify agents who are available to handle the incoming call, select an available agent based on the weighted calculated skill levels, and transfer the incoming call to the selected agent, wherein the agent profile includes an indication of call-handling capacity for each agent, the call-handling capacity representative of the number of non-voice dialog communications the agent is capable of handling simultaneously.

37. The system according to claim 36 wherein the processing means calculates an agent capacity quotient by dividing the number of calls an agent is currently handling by the agent's call-handling capacity.

38. A transaction processing system configured to route incoming calls from callers to agents corresponding to agent terminals associated with the transaction processing system, the incoming calls based on non-voice dialog communication, the system comprising: a processor for identifying a plurality of transaction-handling skills representative of skills possessed by the agents in handling the non-voice dialog communication, the processor configured to calculate a skill level possessed by each agent for at least some of the plurality of transaction-handling skills, generate an agent profile for each agent corresponding to the calculated skill levels, the agent profile including an indication of call-handling capacity for each agent, the call-handling capacity representative of the number of non-voice dialog communications the agent is capable of handling simultaneously, assign a weight to each calculated skill level for each agent, identify agents who are available to handle the incoming call, select an available agent based on the weighted calculated skill levels, and transfer the incoming call to the selected agent.

* * * * *